United States Patent
Parks et al.

(10) Patent No.: US 6,821,664 B2
(45) Date of Patent: Nov. 23, 2004

(54) METHOD AND APPARATUS FOR A COMBINED FUEL CELL AND HYDROGEN PURIFICATION SYSTEM

(75) Inventors: John W. Parks, Loudonville, NY (US); Glen E. Benson, Schenectady, NY (US); Wieslaw J. Zielinski, Watervliet, NY (US); Arne W. Ballantine, Round Lake, NY (US); Richard L. Chartrand, Mechanicville, NY (US)

(73) Assignee: Plug Power, Inc., Latham, NY (US)

( * ) Notice: Subject to any disclaimer, the term of this patent is extended or adjusted under 35 U.S.C. 154(b) by 169 days.

(21) Appl. No.: 10/247,990

(22) Filed: Sep. 20, 2002

(65) Prior Publication Data

US 2004/0058208 A1 Mar. 25, 2004

(51) Int. Cl.[7] .............................. H01M 8/04; H01M 8/18
(52) U.S. Cl. .............................. 429/25; 429/17; 429/19
(58) Field of Search .............................. 429/17, 19, 25

(56) References Cited

U.S. PATENT DOCUMENTS

| | | | | | |
|---|---|---|---|---|---|
| 3,668,013 | A | * | 6/1972 | Franz | 429/25 |
| 6,168,705 | B1 | * | 1/2001 | Molter et al. | 205/637 |
| 6,686,078 | B1 | * | 2/2004 | Jones | 429/17 |

* cited by examiner

Primary Examiner—Patrick Ryan
Assistant Examiner—Thomas H. Parsons
(74) Attorney, Agent, or Firm—Trop, Pruner & Hu, P.C.

(57) ABSTRACT

A method includes (1) operating a fuel processing reactor to convert a hydrocarbon into reformate; (2) flowing reformate through a first pressure regulator to reduce the pressure of the reformate; (3) supplying reformate from the first pressure regulator to a fuel cell to generate electrical power; (4) flowing a portion of the reformate from the fuel processor to a second pressure regulator to reduce the pressure of the reformate while generating the electrical power with the fuel cell; and (5) supplying reformate from the second pressure regulator to the hydrogen purification system while generating the electrical power with the fuel cell.

26 Claims, 3 Drawing Sheets

METHOD AND APPARATUS FOR A COMBINED FUEL CELL AND HYDROGEN PURIFICATION SYSTEM

BACKGROUND

The invention generally relates to apparatuses and associated methods of operation whereby the operation of a fuel cell is coordinated with a fuel processing reactor and a hydrogen separation system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$$H_2 \rightarrow 2H^+ + 2e^- \qquad (1)$$

at the anode of the cell, and $$O_2 + 4H^+ + 4e^- \rightarrow 2H_2O \qquad (2)$$

at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. The flow field plates are generally molded, stamped or machined from materials including carbon composites, plastics and metal alloys. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The GDL's generally comprise either a paper or cloth based on carbon fibers. The PEM and its adjacent pair of catalyst layers are often referred to as a membrane electrode assembly (MEA). An MEA sandwiched by adjacent GDL layers is often referred to as a membrane electrode unit (MEU), or also as an MEA. Common membrane materials include Nation™, Gore Select™, sulphonated fluorocarbon polymers, and other materials such as polybenzimidazole (PBI) and polyether ether ketone. Various suitable catalyst formulations are also known in the art, and are generally platinum-based.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

Fuel cell systems generally include various sources of heat, such as from fuel processing systems, the fuel cell stack itself, exhaust gas oxidizers, etc. In particular, the exhaust from a fuel cell is generally oxidized to remove trace amounts of unreacted fuels before it is exhausted to ambient. Such exhaust is generally hot and saturated with water vapor from the fuel cell system and from combustion of combustible gas components in the exhaust. For a variety of reasons, it may be desirable to recover such heat from a fuel cell system. As examples of such systems in the prior art, the teachings of U.S. application Ser. Nos. 09/728,227 now U.S Pat. No. 6,551,733 and 09/727,921 now U.S. Pat. No. 6,370,878 are hereby incorporated by reference.

Hydrogen purification systems have also been used with fuel cell systems in various ways. For example, a hydrogen purification system can be used to filter a reformate stream to produce a pure hydrogen stream that can be stored or used by a fuel cell. Hydrogen purification systems have also been used to recover hydrogen from fuel cell system exhaust streams. In the context of this invention, a hydrogen purification system may also be referred to as a hydrogen separator, and in either case, such a system can refer to any of the various techniques known in the art for separating hydrogen from gas streams, including electrochemical separation and pressure swing adsorption systems. As examples of such systems in the prior art, the teachings of U.S. Pat. No. 6,280,865, and U.S. application Ser. Nos. 10/214,022, 10/213,798, and 10/214,019 are hereby incorporated by reference.

There is a continuing need for fuel cell system designs and improvements to coordinate the integrated operation of systems including the foregoing.

SUMMARY

The invention provides fuel cell systems and associated methods of operation whereby application of a fuel cell is coordinated with a fuel processor and a hydrogen separator. In particular, the reactant supply system of the fuel cell is made less susceptible to supply pressure transients associated with operation of the hydrogen separation subsystem.

In one aspect, a fuel cell system includes a fuel processing reactor, a hydrogen separator, a fuel cell, and an oxidizer. The fuel processor is coupled to the fuel cell via a first flow path, and to the hydrogen separator via a second flow path. An exhaust port of the fuel cell is coupled to the oxidizer via a third flow path, and an exhaust port of the hydrogen separator is coupled to the oxidizer via a fourth flow path.

A first flow restricting means is located along the first flow path and is adapted to reduce the pressure of reformate provided to the fuel cell from the fuel processing reactor. A second flow restricting means is located along the second flow path and is adapted to reduce the pressure of reformate provided to the hydrogen separator from the fuel processing reactor.

The term "coupled" is used to refer to any direct or indirect connection between two elements of the system. As an example, an indirect connection of two components may include connections to various other components between them. Also, in the context of the present invention, the term "flow path" generally refers to any conduit or housing through which the flow of a process stream is guided in the system. In some cases, different flow paths can be partially coextensive, as in the case where a common conduit splits into two conduits.

For illustration purposes, the discussion provided herein focuses on PEM fuel cell systems. For example, systems under the invention may utilize a PEM fuel cell having an operating temperature less than 100° C. Also, the fuel cell may form a portion of a fuel cell stack. It will be appreciated that the invention may also be used with other types of fuel cells, such as solid oxide, phosphoric acid, molten carbonate, etc.

In embodiments utilizing an electrochemical hydrogen separator, the electrical current used by the hydrogen separator can be supplied by the fuel cell, by a battery, or by some other source, such as a power grid. In some cases, a combined fuel cell and electrochemical hydrogen separation stack can be used, as described in U.S. Pat. No. 6,280,865, and U.S. application Ser. Nos. 10/214,022, 10/213,798, and 10/214,019.

As examples, the first and second flow restricting means can each be a valve. For example, proportional valves (a valve that can be opened to a variable extent) can be used or a modulated binary valve (a valve that is either fully open or fully closed) can also be used to achieve the same effect as a proportional valve by periodically opening and closing. Valves used with the present invention are preferably automatically controlled, but the invention is not intended to be limited by a specific valve design. As another example, the first and second flow restricting means can each be an orifice serving to inhibit flow to a desired extent. As another example, the first and second flow restricting means can each be a spring-biased pressure regulator or a dome-loaded pressure regulator, or any other type of device that can be used to restrict flow. The first and second flow restricting means can also be any combination of the foregoing devices.

In some embodiments, the fuel processing reactor has an outlet coupled to a conduit, wherein the conduit is coupled to the first and second flow paths. In other words, the first and second flow paths are partially coextensive. This conduit can be coupled to a bypass flow path, wherein the bypass flow path includes a valve, and wherein the bypass flow path is coupled to the oxidizer. The fuel exhaust of the stack is preferably coupled to the oxidizer, along with the exhaust of the hydrogen separator. In another embodiment, the purified hydrogen outlet of the hydrogen separator can also be coupled to the first flow path.

In some embodiments, a pressure sensor is provided in the first flow path. A controller is coupled to the pressure sensor and to the second flow restricting means, and is adapted to vary a flow output from the second pressure regulator in response to a signal from the pressure sensor. Some embodiments may further include a valve located in the second flow path between the second flow restricting means and the hydrogen separator. For example, the valve can be closed when the hydrogen separator is not being used to prevent any flow of reformate through the second flow path. In some cases, a controller can be coupled to this valve and to the first flow restricting means, wherein the controller is adapted to open and close the valve to regulate reformate flow to the hydrogen separator, and wherein the controller is adapted to modulate the first flow restricting means to vary the flow of reformate to the fuel cell.

One advantage of this design is that the reactant supply system of the fuel cell is made less susceptible to supply pressure transients associated with operation of the hydrogen separation subsystem. For example, when the fuel cell is supplying an electrical load, if the hydrogen separator is switched on, the resulting drain in reformate supply can cause the stack to be under-supplied with reactants to meet its load. In addition to affecting the stack's ability to maintain a steady supply of power to the load, the stack can also be damaged if an excess load is allowed to drive a fuel cell to a negative voltage. This problem is solved under the present system since a backpressure is created upstream from the fuel cell that acts as a buffer to pressure transients resulting from operation of the hydrogen separator.

In another aspect, a method is provided of coordinating operation of a combined fuel processor, fuel cell and hydrogen purification system, including at least the following steps: (1) operating a fuel processing reactor to convert a hydrocarbon into reformate; (2) flowing reformate through a first pressure regulator to reduce the pressure of the reformate; (3) supplying reformate from the first pressure regulator to a fuel cell to generate electrical power; (4) flowing a portion of the reformate from the fuel processor to a second pressure regulator to reduce the pressure of the reformate while generating the electrical power with the fuel cell; and (5) supplying reformate from the second pressure regulator to the hydrogen purification system while generating the electrical power with the fuel cell.

Embodiments of such methods may further include supplying the electrical power to a load having a power requirement greater than the electrical power supplied by the fuel cell; and regulating the flow of reformate from the fuel processor to the hydrogen purification system to maintain a pressure drop across the first pressure regulator.

In another aspect, a method is provided of operating a fuel cell system, including at least the following steps: (1) flowing reformate from a fuel processor to a fuel cell to generate an electrical current; (2) restricting a pressure of the flow of reformate from the fuel processor to the fuel cell to create a backpressure of reformate; (3) supplying the electrical current to a load having a power requirement greater than a power supplied by the electrical current; (4) releasing a portion of the backpressure of reformate to a flow of reformate from the fuel processor to a hydrogen separator; and (5) regulating the flow of reformate from the fuel processor to the hydrogen separator to maintain the backpressure at a pressure at least as great as a pressure of the reformate flowed to the fuel cell.

In some embodiments, the step of restricting a pressure of the flow of reformate from the fuel processor to the fuel cell includes opening a proportional valve to adjust the flow of reformate to increase the electrical current supplied to the load. Embodiments may further include supplying hydrogen from the hydrogen separator to the fuel cell.

Embodiments of such methods can also include any of the features, design aspects, techniques and methods described herein, either alone or in combination. Advantages and other features of the invention will become apparent from the following description, drawing and claims.

DETAILED DESCRIPTION

Figure 1:
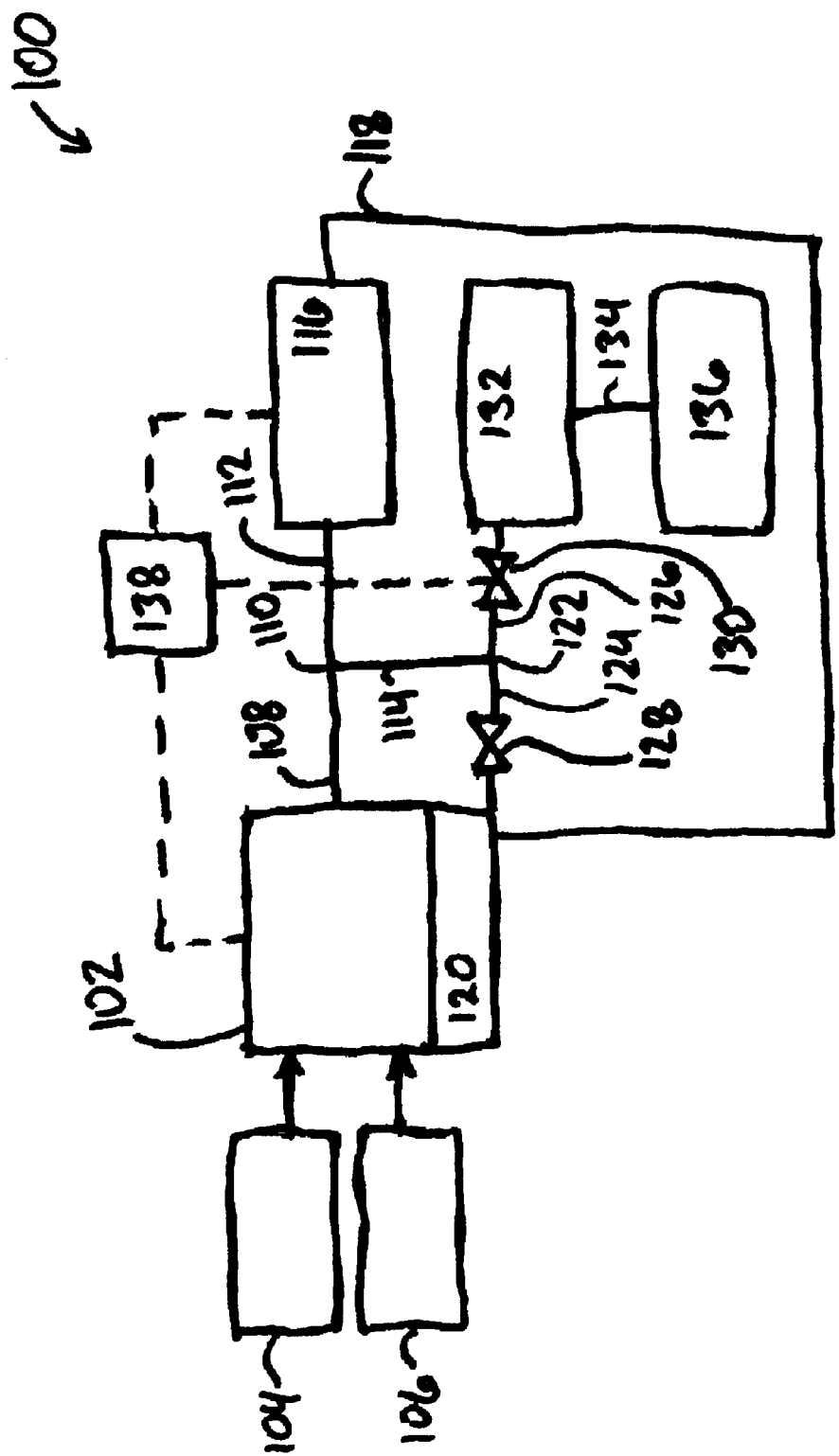
FIG. 1 is an integrated fuel cell system under an embodiment of the present invention.

Referring to FIG. 1, an integrated fuel cell system 100 is shown under an embodiment of the present invention. A fuel processor 102 receives natural gas (or some other hydrocarbon feed) via conduit 104 and air via conduit 106 and produces a reformate stream that is output through conduit 108. As an example, a suitable fuel processor design is described in U.S. application Ser. No. 10/184,291, which is hereby incorporated by reference. Other suitable fuel processor designs are also known in the art.

Conduit 108 is coupled to a first junction 110, from which the reformate stream is divided into conduits 112 and 114. Conduit 112 feeds reformate to fuel cell stack 116 via flow restricting means 142. In the stack 116, hydrogen from the reformate is reacted to produce electricity that is supplied to a load (not shown). In this example, the fuel cell stack 116 is comprised of PEM fuel cells, and has an operating temperature of about 65° C., and a reactant inlet pressure of about 0.5 psig (and a reactant exhaust pressure at ambient pressure). For simplicity, the oxidant supply system associated with the fuel cell stack 116 is not shown.

Spent reformate is exhausted from the fuel cell stack 116 via conduit 118 to oxidizer 120, where it is reacted with oxygen. An oxidant such as air is supplied to the oxidizer 120 via conduit 123. In this example, the oxidizer 120 is a ceramic monolith that has been wash-coated with a platinum catalyst. The oxidizer 120 has an operating temperature of about 800° C. Excess air is supplied to the oxidizer in order to lower the oxidizer temperature as necessary. Heat from the oxidation of hydrogen and other residual combustibles in the oxidizer 120 is recovered with a coolant circuit (not shown) to make steam to humidify the reactants flowed to the fuel cell, and to maintain the fuel cell operating temperature. The exhaust from the oxidizer is vented to ambient via conduit 125.

In some embodiments, a bypass line (not shown) is placed from conduit 108 directly to the oxidizer 120. For example, conduit 108 may include a three-way valve (not shown) that can be used to bypass reformate flow directly to the oxidizer 120 on start-up when the reformate may be temporarily off-specification or when heat may be needed to warm up the system. Such a bypass system can also be used to generate heat to maintain the fuel cell 116 at operating temperature when only the hydrogen separator 132 is in use.

Conduit 114 directs a flow of reformate through flow restricting means 130 to hydrogen separator 132. As examples, the first and second flow restricting means 128 and 130 can each be proportional valves. Such valves used with the present invention are preferably automatically controlled, but the invention is not intended to be limited by a specific valve design. In a preferred embodiment, the first flow restricting means 130 is a proportional valve, and the second flow restricting means 128 is a spring biased pressure regulator. Such a system is advantageous in that only the flow restricting means 130 needs to be dynamically controlled. Systems utilizing additional dynamic control of flow restricting means 128 are generally more complicated and may be less robust.

In this example, the hydrogen separator 132 is an electrochemical hydrogen separator. The hydrogen separator 132 receives power from fuel cell stack 116 (connection not shown). Pure hydrogen is exhausted from hydrogen separator 132 via conduit 134 to hydrogen storage vessel 136. The hydrogen storage vessel 136 can be a pressure tank, or other systems for storing hydrogen that are known in the art, such as metal hydride systems. Hydrogen-depleted exhaust from the hydrogen separator 132 is exhausted via a conduit 121 to oxidizer 120.

In this example, the hydrogen separator 132 is used to pressurize the storage vessel 136 with hydrogen. In some cases, it may be desirable to include a valve (not shown) along the conduit 134 to prevent back diffusion of hydrogen from the storage vessel 136 through the hydrogen separator 132 when the separator 132 is not in use (e.g., is in an off mode). It may also be desirable in some cases to include a compressor (not shown) along conduit 134 to pressurize the storage vessel 136 with the purified hydrogen stream from the separator 132.

One application for the present invention is as a stationary power plant providing a refueling means for hydrogen powered vehicles. Thus, storage vessel 136 may include a tap, valve, quick connect mechanism, or some other means of transferring hydrogen from the vessel 136 to an external application. In other embodiments, it may also be desirable to plumb the system such that hydrogen from the vessel 136 can be supplied to the fuel cell stack 116 when desired (e.g., to meet a transient load increase on the stack 116).

As previously discussed, one advantage of this design is that the reactant supply to the fuel cell 116 is made less susceptible to supply pressure transients resulting from operation of the hydrogen separator 132, since the backpressure created upstream from the first flow restricting means acts as a buffer to pressure transients resulting from a sudden draw of reformate when the hydrogen separator 132 is suddenly switched on. The output of the fuel processor 102 can be increased to supply the extra reformate needed by the hydrogen separator 132 in addition to the fuel cell stack 116. However, there is generally a lag time associated with changing the output of the fuel processor 102, such that the present scheme is useful to provide improved response to transient increases in reformate demand.

Figure 2:
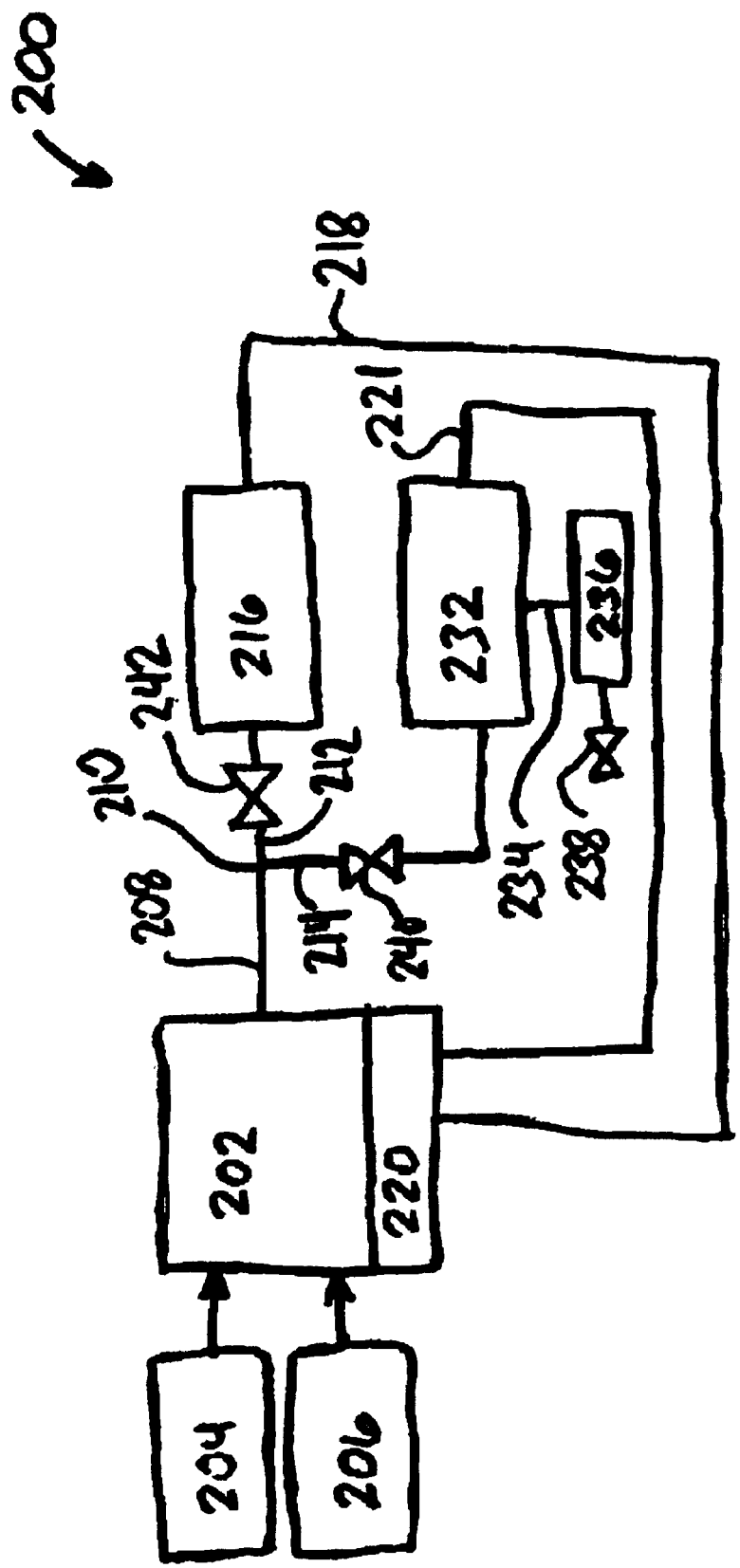
FIG. 2 is an integrated fuel cell system under an embodiment of the present invention.

Referring to FIG. 2, an integrated fuel cell system 200 is shown under an embodiment of the present invention. Similar to system 100, in system 200 a fuel processor 202 receives natural gas via conduit 204 and air via conduit 206 and produces a reformate stream that is output through conduit 208. Conduit 208 is coupled to a first junction 210, from which the reformate steam is divided into conduits 212 and 214. Conduit 212 feeds reformate to fuel cell stack 216 via flow restricting means 242.

Spent reformate is exhausted from the fuel cell stack 216 via conduit 218 to oxidizer 220, where it is reacted with oxygen. An oxidant such as air is supplied to the oxidizer 220 via conduit 223. The exhaust from the oxidizer is vented to ambient via conduit 225.

In some embodiments, a bypass line (not shown) is placed from conduit 208 directly to the oxidizer 220. For example, conduit 208 may include a three-way valve (not shown) that can be used to bypass reformate flow directly to the oxidizer 220 on start-up when the reformate may be temporarily off-specification or when heat may be needed to warm up the system. Such a bypass system can also be used to generate heat to maintain the fuel cell 216 at operating temperature when only the hydrogen separator 232 is in use.

Conduit 214 directs a flow of reformate through flow restricting means 240 to hydrogen separator 232. In a preferred embodiment, the first flow restricting means 242 is a proportional valve, and the second flow restricting means 240 is a spring biased pressure regulator. As previously discussed, such a system is advantageous in that only the flow restricting means 242 needs to be dynamically controlled. Systems utilizing additional dynamic control of flow restricting means 240 are generally more complicated and may be less robust.

In this example, the hydrogen separator 232 is an electrochemical hydrogen separator. The hydrogen separator 232 receives power from fuel cell stack 216 (connection not shown). Pure hydrogen is exhausted from hydrogen separator 232 via conduit 234 to hydrogen storage vessel 236. The hydrogen storage vessel 236 can be a pressure tank, or other systems for storing hydrogen that are known in the art, such as metal hydride systems. Hydrogen-depleted exhaust from the hydrogen separator is exhausted via conduit 221 to oxidizer 220.

In this example, the hydrogen separator 232 is used to pressurize the storage vessel 236 with hydrogen. In some cases, it may be desirable to include a valve (not shown) along the conduit 234 to prevent back diffusion of hydrogen from the storage vessel 236 through the hydrogen separator 232 when the separator 232 is not in use. It may also be desirable in some cases to include a compressor (not shown) along conduit 234 to pressurize the storage vessel 236 with the purified hydrogen stream from the separator 232. Storage vessel 236 may include a hydrogen tap 238, or some other means of transferring hydrogen from the vessel 236 to an external application. In other embodiments, it may also be desirable to plumb the system such that hydrogen from the vessel 236 can be supplied to the fuel cell stack 216 when desired (e.g., to meet a transient load increase on the stack 216).

In the example shown in FIG. 2, a controller 209 is coupled to the first flow restricting means 242 and to valve 240. Thus, when the hydrogen separator 232 is turned on, the controller 209 opens valve 240 and begins restring flow through flow restricting means 242 until a desired amount of reformate is diverted to the hydrogen separator 232. In some embodiments, the output of the fuel processor may also be increased in this process according to a hydrogen demand signal from the fuel cell 216.

Figure 3:
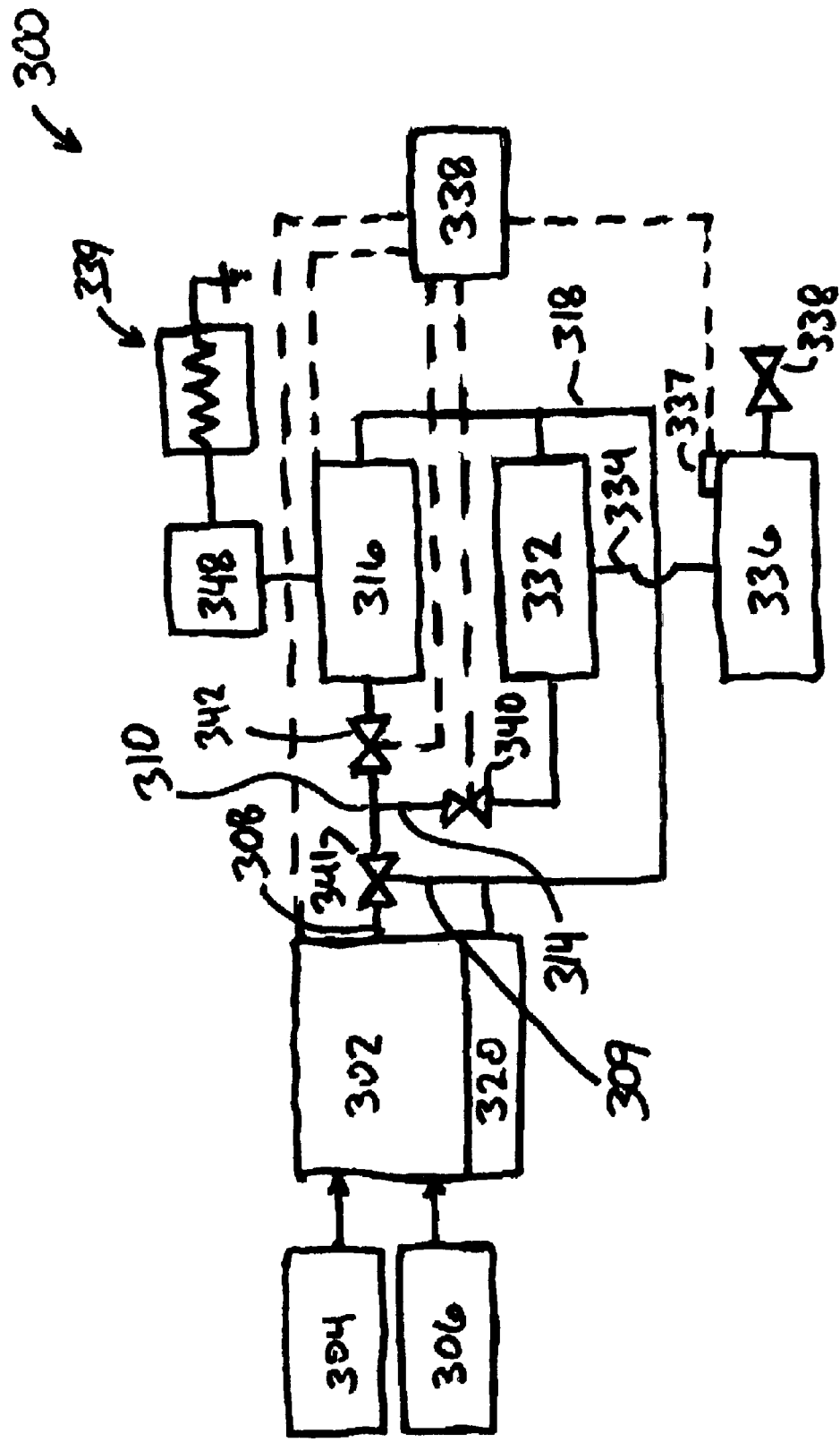
FIG. 3 is an integrated fuel cell system under an embodiment of the present invention.
Figure 1:
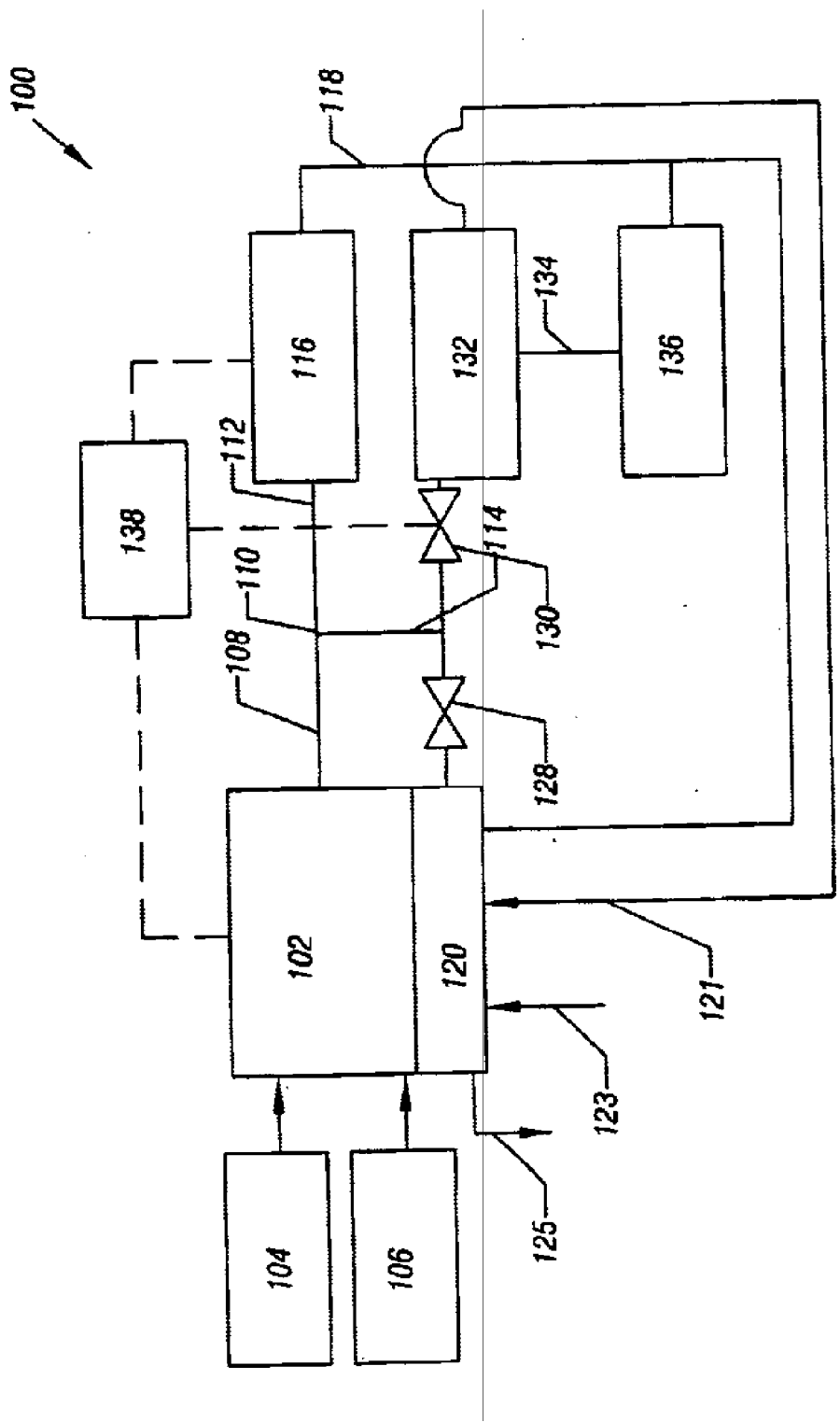
Figure 2:
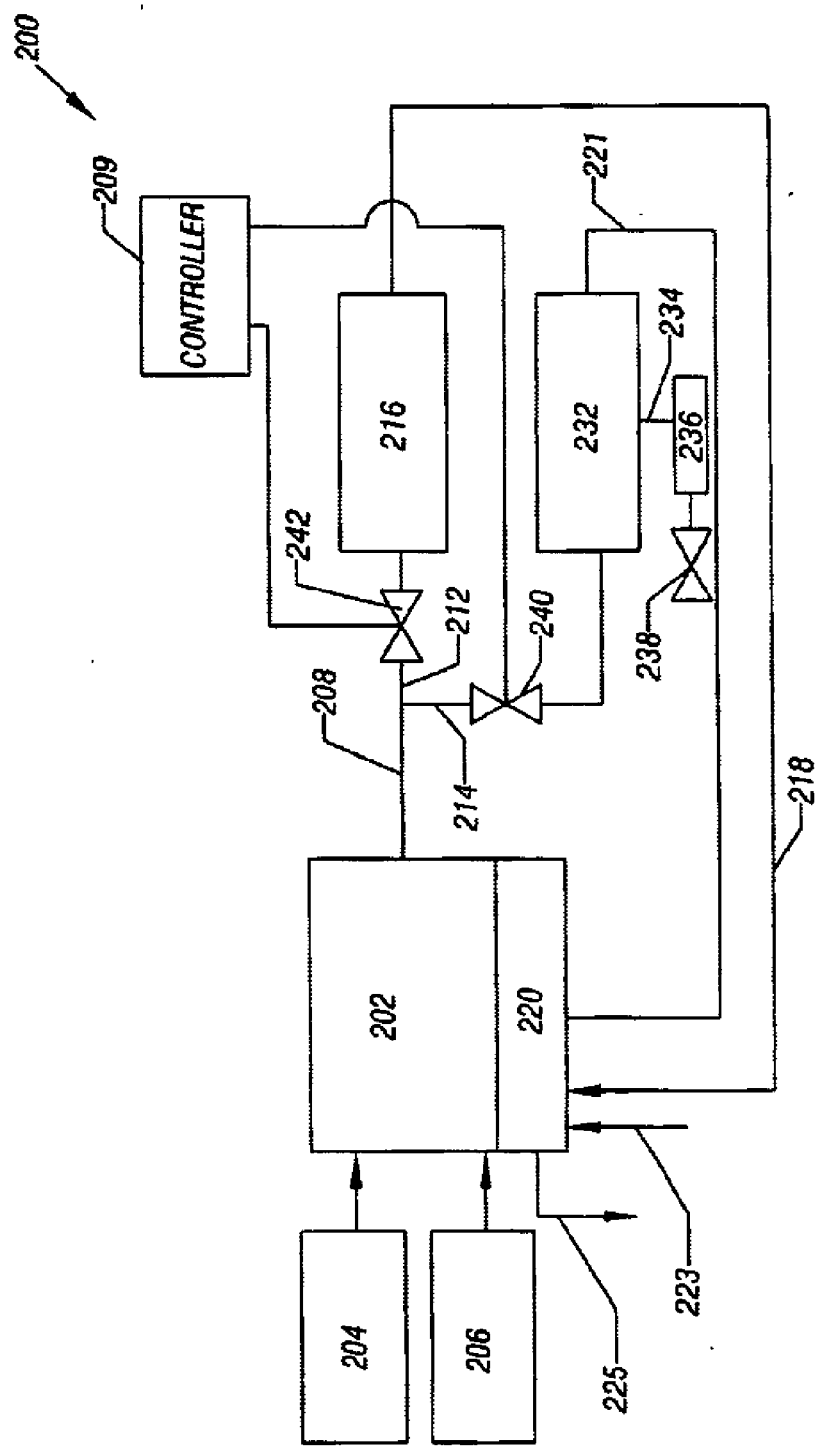
Figure 3:
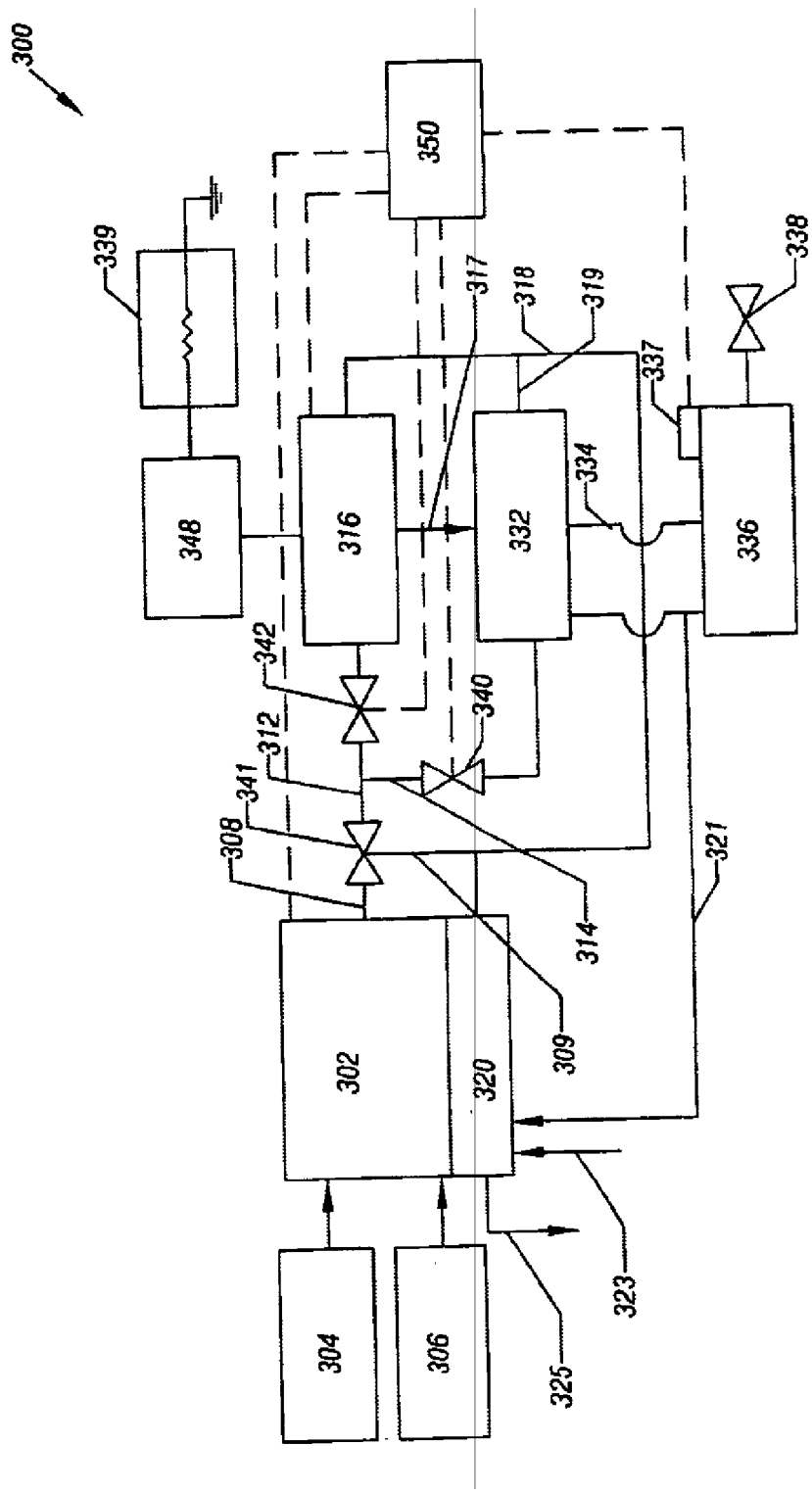

Referring to FIG. 3, an integrated fuel cell system 300 is shown under an embodiment of the present invention. Similar to systems 100 and 200, in system 300 a fuel processor 302 receives natural gas via conduit 304 and air via conduit 306 and produces a reformate stream that is output through conduit 308. Conduit 308 is coupled to a junction from which the reformate stream is divided into conduits 312 and 314. Conduit 312 feeds reformate to fuel cell stack 316 via flow restricting means 342. Direct current from the fuel cell stack 316 is conditioned by power conditioner 348 and supplied to electrical load 339. For example, load 339 can be a power grid within a building, and the load can vary depending on the appliances in use in the building. In such cases, power conditioner 348 inverts the power from the fuel cell stack 316 to alternating current with a voltage suitable for use in the building (e.g., 120 volts). The load 339 can also be a direct current load, such as for powering a motor or charging a bank of batteries, etc.

Spent reformate is exhausted from the fuel cell stack 316 via conduit 318 to oxidizer 320, where it is reacted with oxygen. An oxidant such as air is supplied to the oxidizer 320 via conduit 323. The exhaust from the oxidizer is vented to ambient via conduit 325.

In some embodiments, a bypass line 309 is placed from conduit 308 directly to the oxidizer 320. For example, valve 341 may be used to bypass reformate flow directly to the oxidizer 320 through conduit 309 on start-up when the reformate may be temporarily off-specification or when heat may be needed to warm up the system. Such a bypass system can also be used to generate heat to maintain the fuel cell 316 at operating temperature when only the hydrogen separator 332 is in use.

Conduit 314 directs a flow of reformate through flow restricting means 340 to hydrogen separator 332 when valve 341 is open. In a preferred embodiment, the first flow restricting means 342 is a proportional valve, and the second flow restricting means 340 is a spring biased pressure regulator. As previously discussed, such a system is advantageous in that only the flow restricting means 342 needs to be dynamically controlled. Systems utilizing additional dynamic control of flow restricting means 340 are generally more complicated and may be less robust. Alternatively, in some embodiments, flow restricting means 342 is a pressure regulator and flow restricting means 340 is a proportional valve. Other embodiments are possible with other valve configurations and combinations (e.g., other types of commonly used valves, orifices, and other mechanisms used to regulate flows). A common feature is provided in that a backpressure upstream from the fuel cell stack 316 serves as a buffer against transients in reformate supply pressure when the hydrogen separator 332 is switched on.

In this example, the hydrogen separator 332 is an electrochemical hydrogen separator. The hydrogen separator 332 receives power from fuel cell stack 316 via power connection 317. Pure hydrogen is exhausted from hydrogen separator 332 via conduit 334 to hydrogen storage vessel 336. The hydrogen storage vessel 336 can be a pressure tank, or other systems for storing hydrogen that are known in the art, such as metal hydride systems. Hydrogen-depleted exhaust from the hydrogen separator 332 is exhausted via conduit 321 to oxidizer 320.

In this example, the hydrogen separator 332 is used to pressurize the storage vessel 336 with hydrogen. In some cases, it may be desirable to include a valve (not shown) along the conduit 334 to prevent back diffusion of hydrogen from the storage vessel 336 through the hydrogen separator 332 when the separator 332 is not in use. It may also be desirable in some cases to include a compressor (not shown) along conduit 334 to pressurize the storage vessel 336 with the purified hydrogen stream from the separator 332. Storage vessel 336 may include a hydrogen tap valve 338 as a means of transferring hydrogen from the vessel 336 to an external application (e.g., functioning as a vehicle refueling station).

Hydrogen separator 332 is also coupled to fuel cell stack 316 via conduit 319. For example, when extra fuel is needed by the fuel cell stack (e.g., to meet a peak load or transient load increase), valve 343 can be opened to flow pure hydrogen to the fuel cell stack 316.

In the example shown in FIG. 3, controller 350 is coupled to the first flow restricting means 342, valve 340, valve 341

(connection not shown), valve 347, pressure sensor 337. When the hydrogen separator 332 is turned on, the controller 350 opens valve 341 and begins restring flow through flow restricting means 342 until a desired amount of reformate is diverted to the hydrogen separator 332 via conduit 314 through flow restricting means 340. Pressure sensor 337 initiates a hydrogen demand signal to the controller 350 when the pressure in the hydrogen vessel 336 falls below a predetermined threshold, which signals the controller 338 to switch on the hydrogen separator 332.

In the present example, a pressure sensor is used as a feedback to allow controller 350 to maintain a desired amount of backpressure upstream from valve 342. For example, it may be desirable to operate the hydrogen separator 332 at a single optimized operating point such that its input and output flow rates are always the same. The reduction in reformate supply pressure resulting from operation of the hydrogen separator is thus predictable, and a desired backpressure can be maintained, such that the reformate flow to the fuel cell stack 316 is either not affected or is only affected to a desired degree when the hydrogen separator 332 is switched on. The controller 350 is usually also coupled to the fuel processor to vary the reactant supply (e.g., fuel and air blowers supplying conduits 304 and 306) to the fuel processor 302 as the need of the system for reformate varies.

Still referring to FIG. 3, the system can be further illustrated in different terms as a method for operating such a system. For example, such a method may include the following steps: (1) operating a fuel processing reactor 302 to convert a hydrocarbon into reformate; (2) flowing reformate through a first pressure regulator 342 to reduce the pressure of the reformate; (3) supplying reformate from the first pressure regulator 342 to a fuel cell 316 to generate electrical power; (4) flowing a portion of the reformate from the fuel processor 302 to a second pressure regulator 340 to reduce the pressure of the reformate while generating the electrical power with the fuel cell 316; and (5) supplying reformate from the second pressure regulator 340 to the hydrogen purification system 332 while generating the electrical power with the fuel cell 316.

Embodiments of such methods may further include supplying the electrical power to a load 339 having a power requirement (e.g., a magnitude associated with the load) greater than the electrical power supplied by the fuel cell 316; and regulating the flow of reformate from the fuel processor 302 to the hydrogen purification system 332 to maintain a pressure drop across the first pressure regulator 342 (e.g., by adjusting valve 342 toward a closed position and increasing the flow of reformate from the fuel processor to maintain a desired reactant flow from the fuel processor 302).

Another such method may include the following steps: (1) flowing reformate from a fuel processor 302 to a fuel cell 316 to generate an electrical current; (2) restricting a pressure of the flow of reformate from the fuel processor 302 to the fuel cell 316 to create a backpressure of reformate; (3) supplying the electrical current to a load 339 having a power requirement greater than a power supplied by the electrical current; (4) releasing a portion of the backpressure of reformate to a flow of reformate from the fuel processor 302 to a hydrogen separator 332; and (5) regulating the flow of reformate from the fuel processor 302 to the hydrogen separator 332 to maintain the backpressure at a pressure at least as great as a pressure of the reformate flowed to the fuel cell 316.

In some embodiments, the step of restricting a pressure of the flow of reformate from the fuel processor 302 to the fuel cell 316 includes opening a proportional valve 342 to adjust the flow of reformate to increase the electrical current supplied to the load 339. Embodiments may further include supplying hydrogen from the hydrogen separator 332 to the fuel cell 316.

Embodiments of such methods can also include any of the features, design aspects, techniques and methods described herein, either alone or in combination.

While the invention has been disclosed with respect to a limited number of embodiments, those skilled in the art, having the benefit of this disclosure will appreciate numerous modifications and variations therefrom. It is intended that the invention covers all such modifications and variations as fall within the true spirit and scope of the invention.

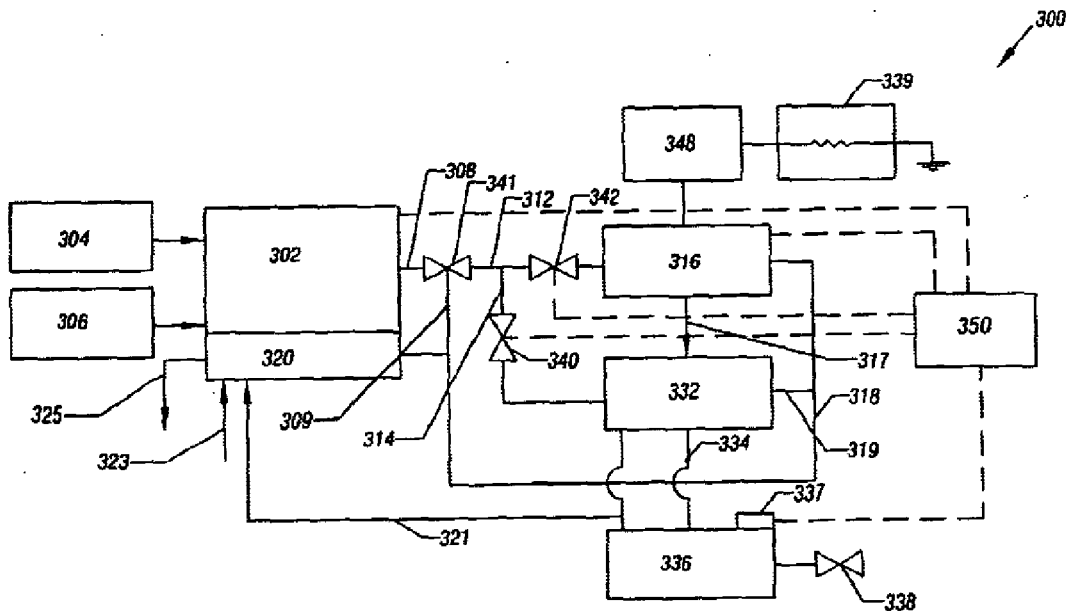

What is claimed is:

1. A fuel cell system, comprising:
a fuel processing reactor, a hydrogen separator, a fuel cell, and an oxidizer, wherein the fuel processor is coupled to the fuel cell via a first flow path, wherein the fuel processor is coupled to the hydrogen separator via a second flow path, wherein an exhaust port of the fuel cell is coupled to the oxidizer via a third flow path, and wherein an exhaust port of the hydrogen separator is coupled to the oxidizer via a fourth flow path;
a first flow restricting means located along the first flow path and adapted to reduce the pressure of reformate provided to the fuel cell from the fuel processing reactor; and
a second flow restricting means located along the second flow path and adapted to reduce the pressure of reformate provided to the hydrogen separator from the fuel processing reactor.

2. The fuel cell system of claim 1, wherein the hydrogen separator is an electrochemical hydrogen separator.

3. The fuel cell system of claim 1, wherein the hydrogen separator is a pressure swing adsorption system.

4. The fuel cell system of claim 1, wherein the fuel cell is a PEM fuel cell having an operating temperature less than 100° C., and wherein the fuel cell forms a portion of a fuel cell stack.

5. The fuel cell system of claim 1, wherein the first flow restricting means is a valve.

6. The fuel cell system of claim 1, wherein the second flow restricting means is a valve.

7. The fuel cell system of claim 1, wherein the first flow restricting means is an orifice.

8. The fuel cell system of claim 1, wherein the second flow restricting means is an orifice.

9. The fuel cell system of claim 1, wherein the first flow restricting means is a spring biased pressure regulator.

10. The fuel cell system of claim 1, wherein the second flow restricting means is a spring biased pressure regulator.

11. The fuel cell system of claim 1, wherein the fuel processing reactor has an outlet coupled to a conduit, wherein the conduit is coupled to the first and second flow paths.

12. The fuel cell system of claim 11, wherein the conduit is coupled to a bypass flow path, wherein the bypass flow path includes a valve, and wherein the bypass flow path is coupled to the oxidizer.

13. The fuel cell system of claim 12, wherein an anode exhaust port of the stack is coupled to the oxidizer, and wherein a first outlet of the hydrogen separator is coupled to the oxidizer.

14. The fuel cell system of claim 13, wherein a second outlet of the hydrogen separator is coupled to the first flow path.

15. The fuel cell system of claim 1, further comprising:
a pressure sensor located in the first flow path; and
a controller coupled to the pressure sensor and coupled to the second flow restricting means, wherein the controller is adapted to vary a flow output from the second pressure regulator in response to a signal from the pressure sensor.

16. The fuel cell system of claim 1, further comprising a valve located in the second flow path between the second flow restricting means and the hydrogen separator.

17. The fuel cell system of claim 1, further comprising:
a valve located in the second flow path between the second flow restricting means and the hydrogen separator; and
a controller coupled to the valve and to the first flow restricting means, wherein the controller is adapted to open and close the valve to regulate reformate flow to the hydrogen separator, and wherein the controller is adapted to modulate the first flow restricting means to vary the flow of reformate to the fuel cell.

18. A method of coordinating operation of a combined fuel processor, fuel cell and hydrogen purification system, comprising:
operating a fuel processing reactor to convert a hydrocarbon into reformate;
flowing reformate through a first pressure regulator to reduce the pressure of the reformate;
supplying reformate from the first pressure regulator to a fuel cell to generate electrical power;
flowing a portion of the reformate from the fuel processor to a second pressure regulator to reduce the pressure of the reformate while generating the electrical power with the fuel cell; and
supplying reformate from the second pressure regulator to the hydrogen purification system while generating the electrical power with the fuel cell.

19. The method of claim 18, wherein the first pressure regulator is a valve.

20. The method of claim 18, wherein the first pressure regulator is a dome-loaded pressure regulator.

21. The method of claim 18, wherein the fuel cell is a PEM fuel cell having an operating temperature less than 100° C., and wherein the fuel cell forms a portion of a fuel cell stack.

22. The method of claim 18, further comprising:
supplying the electrical power to a load having a power requirement greater than the electrical power supplied by the fuel cell; and
regulating the flow of reformate from the fuel processor to the hydrogen purification system to maintain a pressure drop across the first pressure regulator.

23. The method of claim 18, wherein the hydrogen purification system is an electrochemical hydrogen separator.

24. A method of operating a fuel cell system, comprising:
flowing reformate from a fuel processor to a fuel cell to generate an electrical current;
restricting a pressure of the flow of reformate from the fuel processor to the fuel cell to create a backpressure of reformate;
supplying the electrical current to a load having a power requirement greater than a power supplied by the electrical current;
releasing a portion of the backpressure of reformate to a flow of reformate from the fuel processor to a hydrogen separator; and
regulating the flow of reformate from the fuel processor to the hydrogen separator to maintain the backpressure at a pressure at least as great as a pressure of the reformate flowed to the fuel cell.

25. The method of claim 24, wherein the step of restricting a pressure of the flow of reformate from the fuel processor to the fuel cell includes opening a proportional valve to adjust the flow of reformate to increase the electrical current supplied to the load.

26. The method of claim 24, further comprising:
supplying hydrogen from the hydrogen separator to the fuel cell.

* * * * *

UNITED STATES PATENT AND TRADEMARK OFFICE
CERTIFICATE OF CORRECTION

PATENT NO.     : 6,821,664 B2
DATED          : November 23, 2004
INVENTOR(S)    : John W. Parks et al.

It is certified that error appears in the above-identified patent and that said Letters Patent is hereby corrected as shown below:

The title page, showing an illustrative Figure, should be deleted and substitute therefor the attached title page.

Delete Drawing Sheets 1-3, and substitute therefor the Drawing Sheets, consisting of Figures 1-3, as shown on the attached pages.

Signed and Sealed this

First Day of March, 2005

JON W. DUDAS
*Director of the United States Patent and Trademark Office*

(12) United States Patent
Parks et al.

(10) Patent No.: US 6,821,664 B2
(45) Date of Patent: Nov. 23, 2004

(54) METHOD AND APPARATUS FOR A COMBINED FUEL CELL AND HYDROGEN PURIFICATION SYSTEM

(75) Inventors: John W. Parks, Loudonville, NY (US); Glen E. Benson, Schenectady, NY (US); Wieslaw J. Zielinski, Watervliet, NY (US); Arne W. Ballantine, Round Lake, NY (US); Richard L. Chartrand, Mechanicville, NY (US)

(73) Assignee: Plug Power, Inc., Latham, NY (US)

( * ) Notice: Subject to any disclaimer, the term of this patent is extended or adjusted under 35 U.S.C. 154(b) by 169 days.

(21) Appl. No.: 10/247,990

(22) Filed: Sep. 20, 2002

(65) Prior Publication Data
US 2004/0058208 A1 Mar. 25, 2004

(51) Int. Cl.$^7$ .................. H01M 8/04; H01M 8/18
(52) U.S. Cl. ................... 429/25; 429/17; 429/19
(58) Field of Search .................. 429/17, 19, 25

(56) References Cited

U.S. PATENT DOCUMENTS

| 3,668,013 A | * | 6/1972 | Franz | 429/25 |
| 6,168,705 B1 | * | 1/2001 | Molter et al. | 205/637 |
| 6,686,078 B1 | * | 2/2004 | Jones | 429/17 |

* cited by examiner

Primary Examiner—Patrick Ryan
Assistant Examiner—Thomas H. Parsons
(74) Attorney, Agent, or Firm—Trop, Pruner & Hu, P.C.

(57) ABSTRACT

A method includes (1) operating a fuel processing reactor to convert a hydrocarbon into reformate; (2) flowing reformate through a first pressure regulator to reduce the pressure of the reformate; (3) supplying reformate from the first pressure regulator to a fuel cell to generate electrical power; (4) flowing a portion of the reformate from the fuel processor to a second pressure regulator to reduce the pressure of the reformate while generating the electrical power with the fuel cell; and (5) supplying reformate from the second pressure regulator to the hydrogen purification system while generating the electrical power with the fuel cell.

26 Claims, 3 Drawing Sheets